United States Patent [19]

Heng et al.

[11] Patent Number: 5,049,094
[45] Date of Patent: Sep. 17, 1991

[54] FIXING DEVICE FOR FIXING A TERMINAL BLOCK ON A SYMMETRICAL MOUNTING RAIL

[75] Inventors: Jean-Paul Heng, Lyon; Jean-Claude Bidal, Reyrieux; Michel Predignac, Lyon, all of France

[73] Assignee: Entrelec S.A., Villeurbanne, France

[21] Appl. No.: 662,134

[22] Filed: Feb. 28, 1991

[30] Foreign Application Priority Data

Mar. 2, 1990 [FR] France .................. 90 02651

[51] Int. Cl.⁵ ............................................. H01R 9/26
[52] U.S. Cl. ................................. 439/716; 439/94
[58] Field of Search ............... 439/94, 711, 712, 713, 439/714, 715, 716, 717, 723, 724

[56] References Cited

U.S. PATENT DOCUMENTS

| | | | |
|---|---|---|---|
| 4,220,392 | 9/1980 | Debaigt | 439/94 |
| 4,268,108 | 5/1981 | Debaigt | 439/716 |
| 4,454,382 | 6/1984 | Borne et al. | 439/716 X |

FOREIGN PATENT DOCUMENTS

| | | |
|---|---|---|
| 0233458 | 8/1987 | European Pat. Off. |
| 1490769 | 6/1969 | Fed. Rep. of Germany |
| 3526494 | 1/1987 | Fed. Rep. of Germany |

Primary Examiner—Larry I. Schwartz
Assistant Examiner—Khiem Nguyen
Attorney, Agent, or Firm—Sughrue, Mion, Zinn, Macpeak & Seas

[57] ABSTRACT

The fixing device for fixing onto a symmetrical rail comprises a fastening piece and a blade spring. The fastening piece includes a body having first and second hooks, with a third hook between them. The fastening piece also includes a rod connected to the body by a connection zone including a tooth. The blade spring has a longitudinal slot, a first bridge at one end of a curved part and a second bridge at an arched end of the blade spring; these bridges cooperate with the tooth and the third hook to fix the blade spring. The fastening piece is fixed to a case having an earthing terminal fixed to the rod on the fastening piece thereby providing an earth connection for the rail.

3 Claims, 1 Drawing Sheet

FIXING DEVICE FOR FIXING A TERMINAL BLOCK ON A SYMMETRICAL MOUNTING RAIL

The invention relates to fixing a terminal block onto a symmetrical rail.

BACKGROUND OF THE INVENTION

Prior devices are generally part of the terminal block and are situated at one end or base of the terminal block case. Fixing devices include hooks to enable the apparatus to be installed on or removed from the mounting rail.

French patent 2502449 entitled (in translation) "A fixing device for fixing an apparatus on mounting rails" and filed by the present Applicants, describes a device constituted by a fastening lug which is an integral part of the case of the apparatus and by a fastening piece and a compression spring. The fastening piece comprises a rod and a body which slide along a longitudinal guide in the base of the case. The partially-comressed compression spring is fitted in a housing made in the base and has the rod of the fastening piece passing therethrough, said rod co-operating with the body to form shoulders. The end of the rod is fitted with a pin which compresses the spring when the apparatus is mounted on a rail.

The fastening piece includes two hooks for fixing onto rails, and a guide which cooperates with a groove in the base in order to hold the fastening piece captive. Because it moves in the base of the case, such a fastening piece may not be used as an earthing connection to connect the mounting rail to earth.

An object of the invention is to provide a terminal block fixing device which can also be used as an earthing connection.

SUMMARY OF THE INVENTION

The present invention provides a fixing device for fixing a terminal block on a symmetrical rail, the device being situated on a base of an insulating case of the terminal block and including a metal fastening piece and a spring, the fastening piece including a body, first and second rigid hooks under the body, and a rod, the first hook being situated at the opposite end of the body to the rod, the second hook being situated at the other end of the body, and the base including a longitudinal slot in its bottom portion, wherein:

the body has a third hook and a stop between the first and second hooks, the third hook being nearer to the second hook and the stop being nearer to the first hook;

the spring is a blade spring constituted by two sub-blades separated by a slot and interconnected by first and second bridges situated at respective ends of the blade spring;

said blade spring has an arched portion followed by a curved portion bent back towards the convex side of the arched portion;

the rod is connected to the body by a connection zone including a tooth above the body; and the blade spring has its second bridge located at the end of the arched part, said second bridge cooperating with the third hook and the first bridge cooperating with said tooth to fix the blade spring onto the fastening part.

BRIEF DESCRIPTION OF THE DRAWING

An embodiment of the invention is described by way of example with reference to the accompanying drawing, in which.

DETAILED DESCRIPTION

Figure 1:
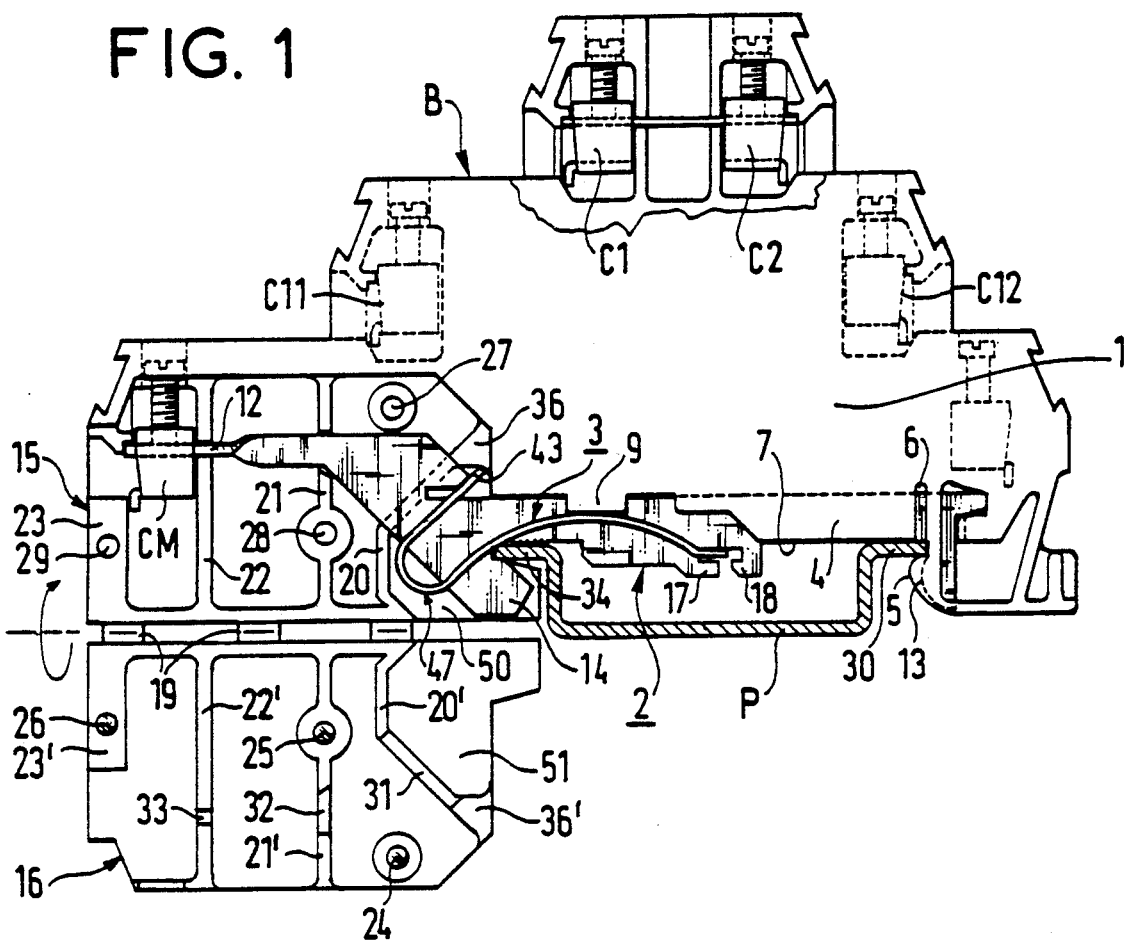
FIG. 1 shows a device of the invention mounted on a symmetrical rail.
Figure 2:
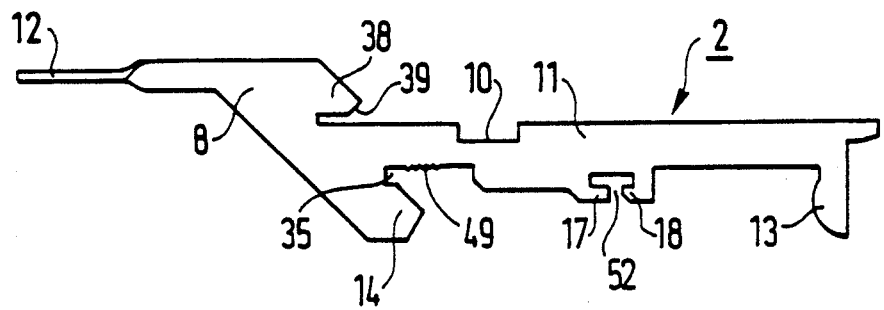
FIG. 2 shows a fastening piece of the FIG. 1 device.

FIG. 1 shows a fixing device of the invention mounted on a symmetrical rail P. The fixing device is constituted by a base 1 of a case B of an apparatus to be fixed, a fastening piece 2, and a blade spring 3. At its top, the case B has terminals C1 and C2 for electrical connections and in its middle it has two other terminals C11 and C12; the number of terminals on the case is independent of the invention.

Near one of its edges, the base 1 of the case includes a lug 5 which forms a corner with the bottom face 7 of the base, said corner facing the opposite edge of the base, and receiving a rim 30 of the symmetrical rail P. A slot 6 made in the base perpendicular to its bottom face 7 thereof and at the edge of the said corner formed by the lug and the bottom face 7, gives the lug 5 a degree of resilience relative to the base, in order to facilitate rail mounting. At the opposite end to the lug 5, the base includes a fixed portion 15 and a moving portion 16, connected by hinges 19 to the fixed portion, the hinges being made of the same plastic as the case B and being integrally molded therewith, as is the moving portion 16. The fixed and moving portions are identical and include ribs 20, 21, 22, 23 on the fixed portion and 20', 21', 22', 23' on the moving portion. Studs 24, 25, 26 on the moving portion cooperate with holes 27, 28, 29 in the fixed portion to fix the moving portion on the fixed portion. The ribs have gaps 31, 32, 33, which can be seen on the moving portion, for receiving and fixing the fastening piece 2.

Figure 3:
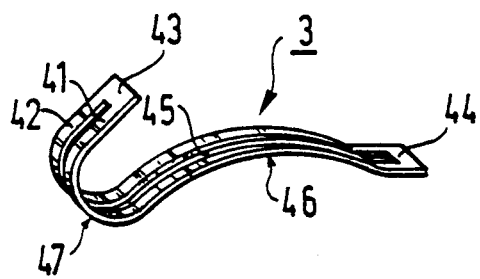
FIG. 3 is a perspective view of a spring of the FIG. 1 device.

The fastening piece 2 includes a body 11 and a rod 12. On its bottom, the body 11 includes a first hook 13, located at the opposite end of the body to the rod, and a second hook 14 located at the other end of the body. Between the first and second hooks, the body has a third hook 17 and a stop 18, the third hook being nearer the second hook 14 and the stop being nearer the first hook 13. The top of the fastening piece has a notch 10 which cooperates with a tooth 9 on the base to stop any longitudinal movement of the fastening piece in the base 1, in whose bottom portion there is a longitudinal slot 1, made in the thickness of the base to house the hook 13 and that portion of the body 11 which lies between the stop 18 and said hook 13. The rod 12 is offset relative to the body 11 and it extends parallel thereto from the top end thereof, constituting a kind of extension to the body 11. The rod and the body are thus connected by a connection zone 8 which includes a tooth 38 whose end 39, facing the top of the body and inclined relative thereto, is used as a rest for the blade spring 3. This blade spring, shown in perspective FIG. 3, is constituted by two sub-blades 41, 42 interconnected by two bridges 43, 44, one at each end of the blade spring; the sub-blades are separated by a slot 45. The blade spring includes an arched portion 46 ending in the bridge 44 and a curved portion 47 bent back towards the convex side of the arched portion and including the bridge 43. The blade spring is mounted onto the fastening piece as follows: with the blade spring practically perpendicular to the body 11, the first hook 13 is engaged in the slot 45, the bridge 44 is engaged between the third hook 17 and the stop 18, and the blade spring is moved back towards the end of the body 11 nearest the rod 12; the body moves into the slot 45 until the bridge 43 of the curved portion 47 comes into contact with the top of the body. In this position, the tooth 44 is parallel to the bottom of the body and is trapped in the space between the third hook 17, the stop 18 and said bottom, since the width of the tooth 44 is greater than that of the space 52 between the third hook 17 and the stop 18.

The first hook 13 of the fastening piece now fitted with its blade spring is inserted into the longitudinal slot of the bottom portion 4 of the base 1. The notch 10 in the body cooperates with the tooth 9 on the base; the connection zone 8 fits into the gaps 31 and 32, and the rod 12 fits into the gap 33. The curved portion 47 of the blade spring fits into a housing delimited by the ribs 20 and 20', by the wall 50 of the fixed portion 15, and by the wall 51 of the moving portion 16.

When the case B fitted with the fastening piece 2 is mounted on the symmetrical rail P, the curved portion 47 of the blade spring is compressed by the rail rim 34 which is engaged in a notch 35 in the fastening piece, said notch being located between the second hook 14 and the bottom of the body 11. The bridge 43 then abuts against the end 39 of the tooth 38 and against the end 36 of the rib 20 and the end 36' of the rib 20'.

The rod 12 is fixed to an earthing terminal CM which enables the rail P to be connected to earth via the fastening piece 2 which, in the present invention, is fixed in the base of the case.

The contact established between the fastening piece 2 and the rail via the rail rims 30 and 34 and the hooks 13 and 14, is improved by contact teeth 49 situated on the bottom of the fastening part 2, near the notch 35, said contact teeth 49 bearing against the rim 34 of the rail P.

We claim:

1. A fixing device for fixing a terminal block on a symmetrical rail, the device being situated on a base of an insulating case of the terminal block and including a metal fastening piece and a spring, the fastening piece including a body, first and second rigid hooks under the body, and a rod, the first hook being situated at the opposite end of the body to the rod, the second hook being situated at the other end of the body, and the base including a longitudinal slot in its bottom portion, wherein:

the body has a third hook and a stop between the first and second hooks, the third hook being nearer to the second hook and the stop being nearer to the first hook;

the spring is a blade spring constituted by two sub-blades separated by a slot and interconnected by first and second bridges situated at respective ends of the blade spring;

said blade spring has an arched portion followed by a curved portion bent back towards the convex side of the arched portion;

the rod is connected to the body by a connection zone including a tooth above the body; and wherein the blade spring has its second bridge located at the end of the arched part, said second bridge cooperating with the third hook and the first bridge cooperating with said tooth to fix the blade spring onto the fastening part.

2. A fixing device according to claim 1, wherein the rod on the fastening piece is fixed to an earthing terminal to connect the mounting rail to earth.

3. A fixing device according to claim 1, wherein the bottom of the body has contact teeth facing the second hook.

* * * * *